C. E. BUCKBEE.
SELF ADJUSTING BEARING.
APPLICATION FILED JULY 29, 1915.
1,178,129.
Patented Apr. 4, 1916.
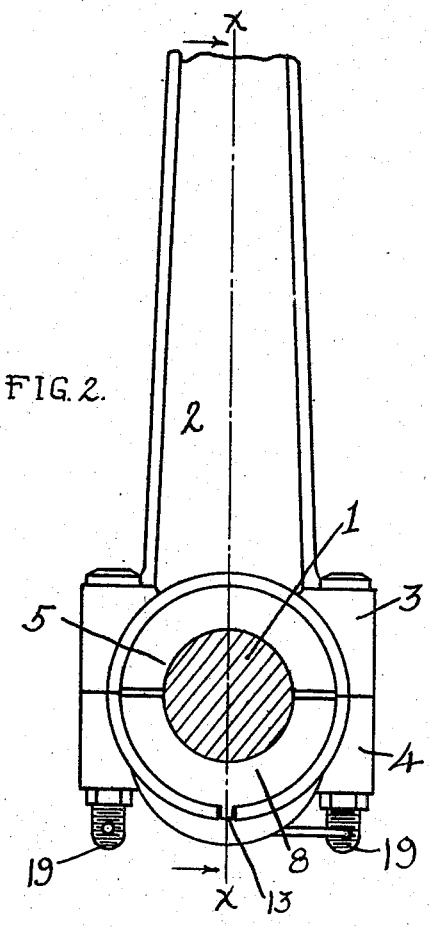
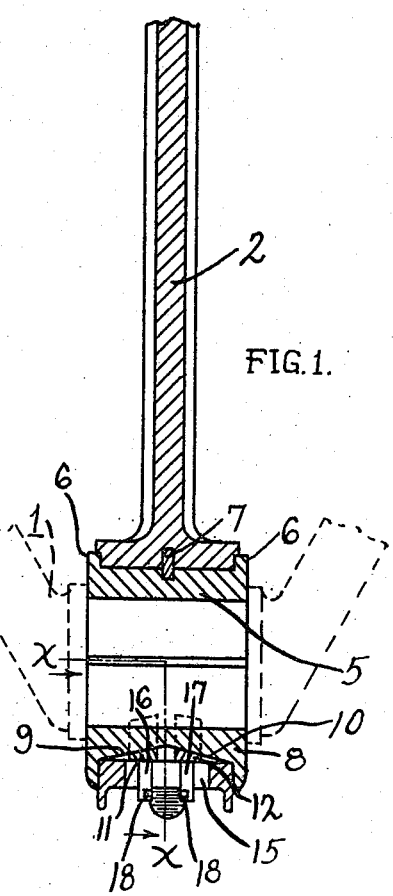
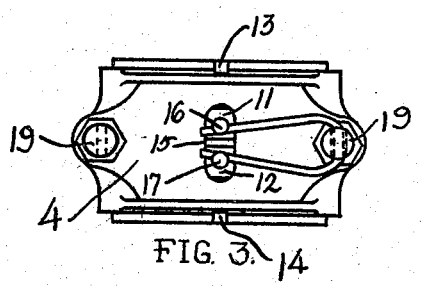
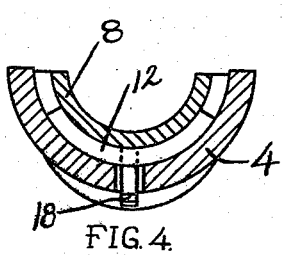
Inventor
CHARLES E. BUCKBEE.
Witness
By
Attorney

UNITED STATES PATENT OFFICE.

CHARLES E. BUCKBEE, OF DETROIT, MICHIGAN, ASSIGNOR OF ONE-HALF TO RUDOLPH R. PAUL, OF DETROIT, MICHIGAN.

SELF-ADJUSTING BEARING.

1,178,129.    Specification of Letters Patent.    Patented Apr. 4, 1916.

Application filed July 29, 1915. Serial No. 42,649.

*To all whom it may concern:*

Be it known that I, CHARLES E. BUCKBEE, a citizen of the United States, residing at Detroit, county of Wayne, State of Michigan, have invented a certain new and useful Improvement in Self-Adjusting Bearings, and declare the following to be a full, clear, and exact description of the same, such as will enable others skilled in the art to which it pertains to make and use the same, reference being had to the accompanying drawings, which form a part of this specification.

This invention relates to self adjusting bearings of simple and inexpensive form for shafts and its object is a bearing that automatically takes up wear preventing a looseness of the shaft in the bearing.

With the ordinary bearings now in use in which a bushing is provided continual rotation of the shaft in the bushing gradually wears the bushing so that the shaft becomes loose therein causing vibration, which if allowed to continue is destructive of the boxing. With the device here shown the bearing is self-adjusting so that the shaft is tightly held in the bearing at all times due to the fact that as the wear takes place the bushing is automatically set up thus compensating for the wear. The device is adapted for use with rotating shafts of various types, as line shafting, power transmission shafting of an automobile, or the like, the crank shaft of an internal combustion engine and various other places as will be readily understood by those familiar with the art.

Various objects of the invention and the several novel features of construction are hereinafter more fully described and claimed and shown in the accompanying drawings in which—

Figure 1 is a vertical section of a bearing embodying my invention taken on line *x—x* of Fig. 2. Fig. 2 is a side view thereof showing the shaft in cross-section. Fig. 3 is a plan view of the cap showing the spring utilized in adjusting the bearing. Fig. 4 is a cross-section through part of the bearing taken on line *x—x* of Fig. 1.

Similar characters refer to similar parts throughout the drawing and specification.

In the drawing I have shown the bearing as utilized with the crank shaft 1 and connecting rod 2 of an internal combustion engine. It is to be understood that the bushing and the self adjusting features may be utilized with shafts and boxings of various types without departing from the spirit of this invention. The connecting rod is provided with the usual box 3 and cap 4 therefor forming the lower part of the box. The portion 3 of the box is provided with the usual semi-cylindrical bushing member 5 flanged at 6 at each end to prevent longitudinal movement of the bushing relative to the box, and a pin 7 is provided to prevent rotation of the bushing relative to the box. The cap 4 is provided with a companion bushing member 8, the two members fitting the shaft. One or both members are slightly less than a half-cylinder so that the members are spaced apart by the shaft when in position, as shown in the drawings. The bushing member 8 has an outer surface formed with two tapered surfaces 9 and 10 at opposite angles preferably each way from the center. Engaging between each tapered surface and the cap is a wedge 11 and 12 respectively having a tapered face engaging the tapered surface of the bushing and preferably extending around the bushing each way from the center as indicated in Fig. 4. The bushing member 8 is provided with similar lugs 13 and 14 in opposite ends thereof engaging in grooves provided in the cap 4 to prevent rotation of the bushing relative to the cap. The cap is also provided with a slot 15 extending parallel with the longitudinal axis of the bushing and the wedges 11 and 12 are each provided with a pin 16 and 17 respectively extending through the said slot. The pins are each grooved near the end as indicated at 18 in Figs. 1 and 4, to receive the ends of a spring wire as indicated in Fig. 3, tending to spread the wedges and force them up the incline between the cap and the member 8. The spring may be conveniently supported preferably by one of the cap bolts 19 which is apertured to receive the spring as shown in Figs. 2 and 3. While a single wedge may fully serve the purpose I prefer to use the two wedges on oppositely inclined surfaces whereby each end of the bushing is similarly forced downward onto the shaft so that the wear is uniformly taken up the full length of the bushing.

From the foregoing description it becomes evident that as the bushing wears the wedges are forced up the inclines 9 and 10 keeping the bushing tight on the shaft and preventing a looseness of the shaft therein. Such result is particularly desirable with the crank shafts of an internal combustion engine to prevent what is termed a "knock" of the connecting rod. It is further to be seen that the device is simple in construction and inexpensive to manufacture, there being but few parts in addition to such as are used with the ordinary bearing of like nature.

Having thus briefly described my invention, its utility, what I claim and desire to secure by Letters Patent of the United States is—

1. A bearing for shafts comprising in combination with the box a pair of semi-cylindrical members supported by the box and fitting the shaft, the members being spaced apart by the shaft, one of said members having an outer coned face, a wedge between the box and the coned face adapted to force the bushing members together to compensate for wear, and a spring engaging the wedge.

2. A bearing for shafts comprising in combination with a box and cap therefor, a pair of semi-cylindrical members fitting the shaft and spaced apart thereby, the members being retained by the boxing, one of said members having a coned face tapered each way from the center, a wedge for each of the tapered faces, and a spring interposed between the wedges tending to force the wedges apart and thus force the bushing members together to compensate for wear.

3. A bearing for shafts comprising in combination with a box and cap therefor, a pair of semi-cylindrical bushing members fitting the shaft and spaced apart thereby, means for holding each of the members in the box, one of said members having an outer coned face tapering each way from the center, a wedge engaging between each of the tapered faces and the box, and a spring under tension engaging each wedge tending to force the wedges apart and force the bushing members together to compensate for wear.

4. A bearing for shafts comprising in combination with a box and cap therefor, a pair of semi-cylindrical bushing members fitting the shaft and spaced apart thereby, one of said members having an outer face provided with two tapered surfaces at an angle one to the other, and at similar angles to the longitudinal axis of the shaft, a wedge for each of said tapered portions positioned between the bushing and the box, the box being slotted, a lug secured to each of the wedges and projecting through the slot, and a spring engaging the lugs tending to force the wedges up the respective inclined surface and thus force the bushing members together to compensate for wear.

In testimony whereof, I sign this specification.

CHARLES E. BUCKBEE.

Copies of this patent may be obtained for five cents each, by addressing the "Commissioner of Patents, Washington, D. C."